US012769166B2

(12) United States Patent
Komura et al.

(10) Patent No.: US 12,769,166 B2
(45) Date of Patent: Oct. 20, 2026

(54) DISPLAY DEVICE

(71) Applicant: Magnolia White Corporation, Tokyo (JP)

(72) Inventors: Shinichi Komura, Tokyo (JP); Yasuhiro Takahashi, Tokyo (JP); Jin Hirosawa, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 295 days.

(21) Appl. No.: 18/534,892

(22) Filed: Dec. 11, 2023

(65) Prior Publication Data

US 2024/0255805 A1 Aug. 1, 2024

(30) Foreign Application Priority Data

Jan. 31, 2023 (JP) ................................ 2023-012911

(51) Int. Cl.
*G02F 1/13363* (2006.01)
*G02B 5/32* (2006.01)
*G02F 1/1335* (2006.01)

(52) U.S. Cl.
CPC .. *G02F 1/133638* (2021.01); *G02F 1/133536* (2013.01); *G02B 5/32* (2013.01); *G02F 2413/03* (2013.01); *G02F 2413/05* (2013.01); *G02F 2413/06* (2013.01)

(58) Field of Classification Search
CPC .............. G02B 27/017; G02B 27/0179; G02B 2027/0181; G02B 2027/0185
See application file for complete search history.

(56) References Cited

U.S. PATENT DOCUMENTS

| | | | | |
|---|---|---|---|---|
| 6,421,183 | B1 | 7/2002 | Ophey | |
| 10,871,627 | B1 * | 12/2020 | Fang | G02B 27/0093 |
| 2001/0028332 | A1 | 10/2001 | Roest | |
| 2006/0119539 | A1 | 6/2006 | Kato et al. | |
| 2017/0068102 | A1 * | 3/2017 | Wong | G02B 27/148 |
| 2018/0180889 | A1 | 6/2018 | Lee et al. | |
| 2019/0079234 | A1 | 3/2019 | Takagi et al. | |
| 2019/0265493 | A1 | 8/2019 | Takagi et al. | |
| 2019/0265494 | A1 | 8/2019 | Takagi et al. | |
| 2020/0174284 | A1 | 6/2020 | Chan et al. | |
| 2021/0302745 | A1 * | 9/2021 | Mutlu | G01B 9/02092 |
| 2022/0113544 | A1 * | 4/2022 | Komura | G02B 5/3083 |

* cited by examiner

*Primary Examiner* — Alexander P Gross
(74) *Attorney, Agent, or Firm* — Michael Best & Friedrich LLP

(57) ABSTRACT

According to one embodiment, a display device includes a display module configured to emit display light which is linearly polarized light, a first structure including a first retardation film facing the display module, a holographic optical element facing the first retardation film, and a second retardation film facing the holographic optical element, a second structure including a reflective polarizer facing the second retardation film, and a transparent substrate facing the reflective polarizer, and a variable mechanism by which an interval between the first structure and the second structure is made variable.

14 Claims, 18 Drawing Sheets

DISPLAY DEVICE

CROSS-REFERENCE TO RELATED APPLICATIONS

This application is based upon and claims the benefit of priority from Japanese Patent Application No. 2023-012911, filed Jan. 31, 2023, the entire contents of which are incorporated herein by reference.

FIELD

Embodiments described herein relate generally to a display device.

BACKGROUND

In recent years, technology of using a head-mounted display worn on the head of a user and providing, for example, virtual reality (VR) has been drawing attention. The head-mounted display is configured to display an image on a display provided in front of the eyes of the user. By this configuration, the user who wears the head-mounted display can experience a virtual reality space with realism.

DETAILED DESCRIPTION

Figure 1:
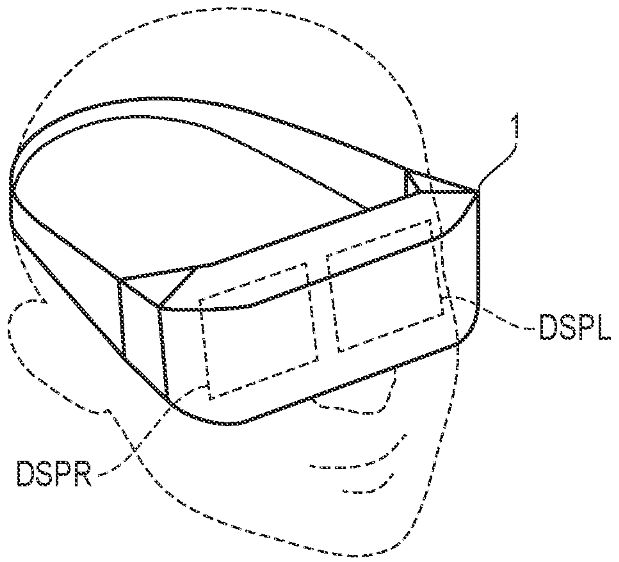
FIG. 1 is a perspective view showing an example of the external appearance of a head-mounted display 1.

In general, according to one embodiment, a display device comprises a display module configured to emit display light which is linearly polarized light, a first structure comprising a first retardation film facing the display module, a holographic optical element facing the first retardation film, and a second retardation film facing the holographic optical element, a second structure comprising a reflective polarizer facing the second retardation film, and a transparent substrate facing the reflective polarizer, and a variable mechanism by which an interval between the first structure and the second structure is made variable.

According to another embodiment, a display device comprises a display module configured to emit display light which is linearly polarized light, a first structure comprising a first retardation film facing the display module, a semi-transmissive layer facing the first retardation film, and a second retardation film facing the semi-transmissive layer, a second structure comprising a reflective polarizer facing the second retardation film, a third retardation film facing the reflective polarizer, and a liquid crystal element facing the third retardation film and having a lens effect, and a variable mechanism by which an interval between the first structure and the second structure is made variable.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the drawings, in order to facilitate understanding, an X-axis, a Y-axis and a Z-axis orthogonal to each other are shown depending on the need. A direction parallel to the X-axis is referred to as a first direction X. A direction parallel to the Y-axis is referred to as a second direction Y. A direction parallel to the Z-axis is referred to as a third direction Z. The plane defined by the X-axis and the Y-axis is referred to as an X-Y plane. When the X-Y plane is viewed, the appearance is defined as a plan view.

Basic Configuration

FIG. 1 is a perspective view showing an example of the external appearance of a head-mounted display 1.

The head-mounted display 1 comprises, for example, a display device DSPR for the right eye and a display device DSPL for the left eye. In a state where the user wears the head-mounted display 1 on the head, the display device DSPR is provided to be located in front of the right eye of the user, and the display device DSPL is provided to be located in front of the left eye of the user.

Figure 2:
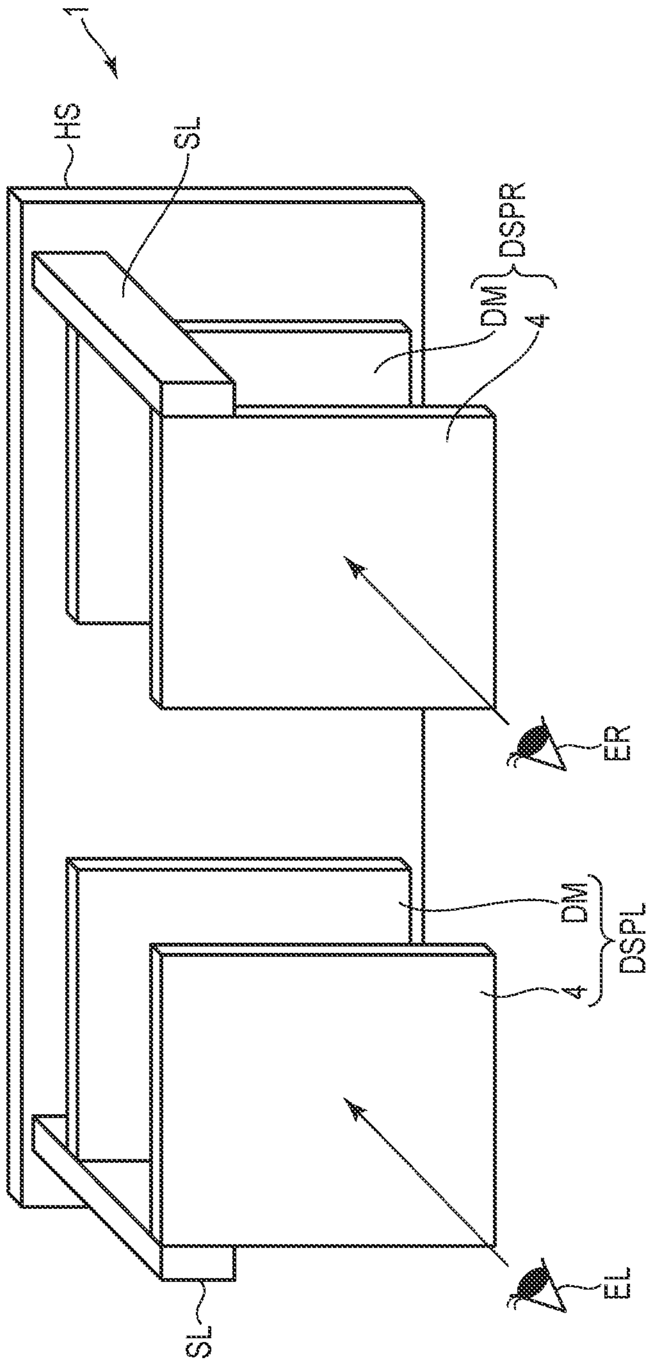
FIG. 2 is a diagram for explaining the outline of the configuration of the head-mounted display 1 shown in FIG. 1.

FIG. 2 is a diagram for explaining the outline of the configuration of the head-mounted display 1 shown in FIG. 1.

The head-mounted display 1 comprises a housing HS which accommodates the display device DSPR and the display device DSPL, and a variable mechanism SL provided in each of the display device DSPR and the display device DSPL.

The display device DSPR is configured in substantially the same manner as the display device DSPL. Each of the display device DSPR and the display device DSPL comprises a display module DM and an optical system 4. The display module DM is configured to emit display light which is linearly polarized light. The optical system 4 of the display device DSPR is configured to guide the display light from the display module DM to the right eye ER. The optical system 4 of the display device DSPL is configured to guide the display light from the display module DM to the left eye EL.

For example, the display module DM consists of a liquid crystal panel and an illumination device. However, the display module DM is not limited to this configuration. For example, the display module DM may be a display panel comprising a self-luminous light emitting element such as an organic electroluminescent (EL) element, a micro LED or a mini LED. When the display module DM is a display panel comprising a light emitting element, the illumination device is omitted.

The variable mechanism SL is secured to the housing HS. As described later, the variable mechanism SL is a mechanism by which the interval between the first and second structures 4A and 4B of the optical system 4 is made variable.

Now, some configuration examples of the display device DSP of the embodiment are explained.

First Configuration Example

Figure 3:
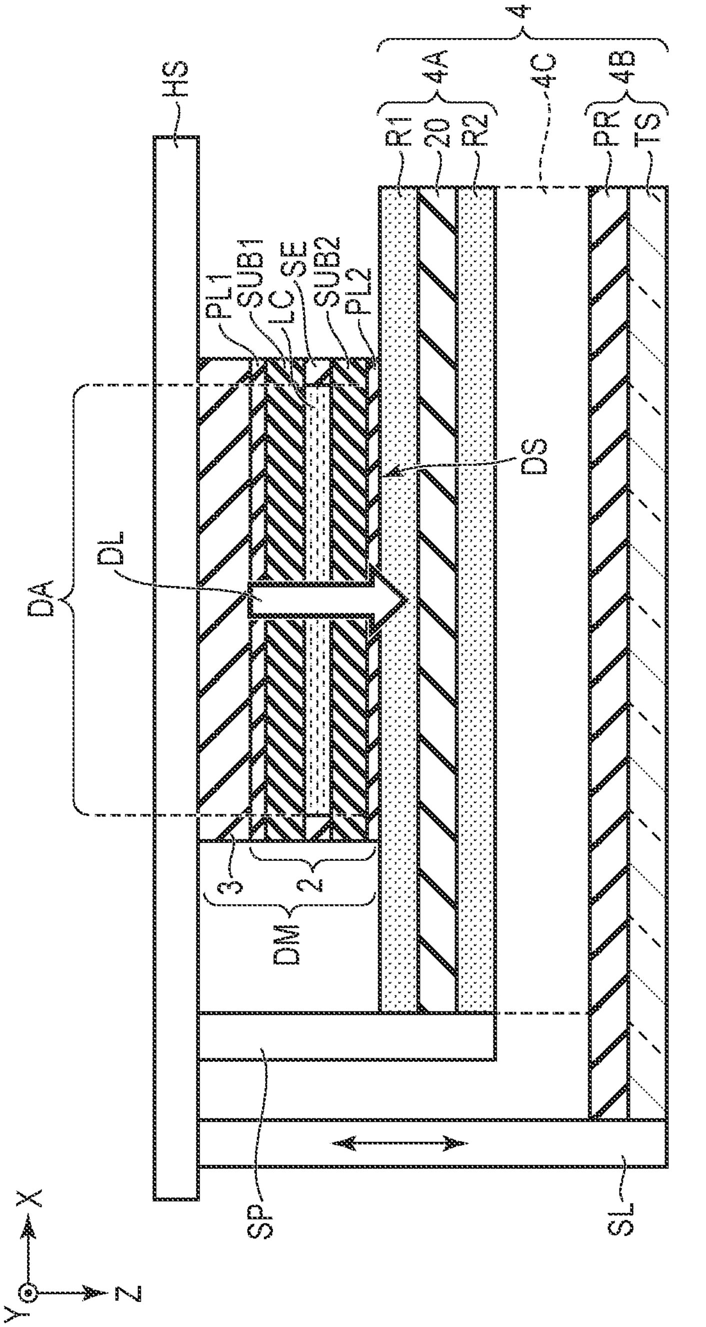
FIG. 3 is a cross-sectional view showing the first configuration example of a display device DSP.

FIG. 3 is a cross-sectional view showing the first configuration example of the display device DSP.

The display device DSP explained here can be applied to each of the display devices DSPR and DSPL described above.

The display module DM comprises a display panel 2 and an illumination device 3. The display panel 2 is a transmissive liquid crystal panel and is formed into a plate-like shape. The display panel 2 comprises a first substrate SUB1, a second substrate SUB2, a liquid crystal layer LC, a first polarizer PL1 and a second polarizer PL2. The liquid crystal layer LC is held between the first substrate SUB1 and the second substrate SUB2, and is sealed with a sealant SE. The first polarizer PL1 is provided between the illumination device 3 and the first substrate SUB1. The second polarizer PL2 is provided between the second substrate SUB2 and the optical system 4.

The display panel 2 comprises a display area DA configured to emit display light DL which is linearly polarized light. The display area DA is configured to selectively modulate the illumination light emitted from the illumination device 3. Part of the illumination light passes through the second polarizer PL2 and is converted into display light DL which is linearly polarized light. The surface of the second polarizer PL2 is referred to as a display surface DS.

The optical system 4 comprises a first structure 4A and a second structure 4B. The first structure 4A is spaced apart from the second structure 4B in the normal direction of the display surface DS. An aerial layer 4C is interposed between the first structure 4A and the second structure 4B. The display panel 2 is provided between the illumination device 3 and the first structure 4A. The first structure 4A is provided between the display panel 2 and the second structure 4B (or between the display panel 2 and the aerial layer 4C).

The first structure 4A comprises a first retardation film R1 facing the display module DM, a holographic optical element 20 facing the first retardation film R1, and a second retardation film R2 facing the holographic optical element 20. The holographic optical element 20 is located between the first retardation film R1 and the second retardation film R2. For example, the first retardation film R1, the holographic optical element 20 and the second retardation film R2 are attached to each other.

The first retardation film R1 and the second retardation film R2 are quarter-wave plates and impart a quarter-wave retardation to the light which passes through the retardation films.

The holographic optical element 20 reflects and diffracts part of incident light and comprises a lens function for condensing light. The holographic optical element 20 comprises an interference pattern and diffracts incident light to a predetermined direction.

The second structure 4B comprises a reflective polarizer PR facing the second retardation film R2, and a transparent substrate TS facing the reflective polarizer PR. For example, the reflective polarizer PR is attached to the transparent substrate TS. The aerial layer 4C is interposed between the second retardation film R2 and the reflective polarizer PR.

Of the incident light, the reflective polarizer PR transmits first linearly polarized light and reflects second linearly polarized light orthogonal to the first linearly polarized light. For example, the reflective polarizer PR is a multilayer thin film polarizer or a wire-grid polarizer.

The transparent substrate TS is a glass substrate or a resinous substrate.

The variable mechanism SL and a support body SP are secured to the housing HS.

The first structure 4A is supported by the support body SP and is secured to the housing HS across an intervening constant gap. The display module DM is provided between the housing HS and the first structure 4A. In this configuration, the display module DM and the first structure 4A are held without moving in the normal direction of the display surface DS relative to the housing HS.

The second structure 4B is supported by the variable mechanism SL. The variable mechanism SL is configured to move the second structure 4B in the normal direction of the display surface DS. When the second structure 4B moves, the variable mechanism SL slides the second structure 4B in the normal direction of the display surface DS without rotating the second structure 4B in a plane. By this configuration, the interval between the first structure 4A and the second structure 4B can be changed.

Figure 4:
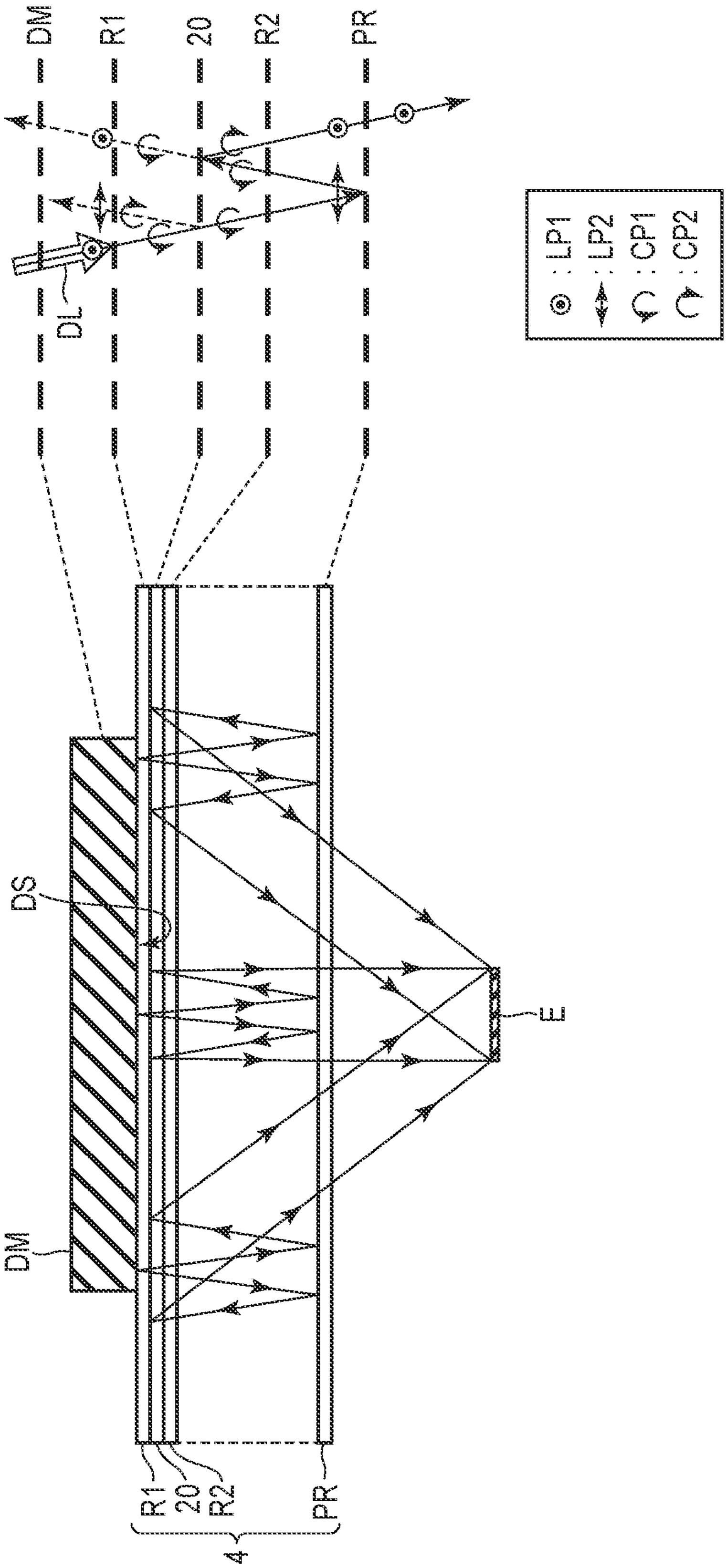
FIG. 4 is a diagram for explaining the optical effect of the display device DSP.

FIG. 4 is a diagram for explaining the optical effect of the display device DSP.

First, the display module DM emits display light DL which is the first linearly polarized light LP1 from the display surface DS. The display light DL passes through the first retardation film R1 and is converted into first circularly polarized light CP1.

Part of the first circularly polarized light CP1 which passed through the first retardation film R1 passes through the holographic optical element 20. The other first circularly polarized light CP1 is reflected on the holographic optical element 20. The first circularly polarized light CP1 which passed through the holographic optical element 20 passes through the second retardation film R2 and is converted into second linearly polarized light LP2.

When the first circularly polarized light CP1 is reflected on the holographic optical element 20, the first circularly polarized light CP1 is converted into second circularly polarized light CP2 which rotates in the opposite direction of the first circularly polarized light CP1. The second circularly polarized light CP2 reflected on the holographic optical element 20 passes through the first retardation film R1, is converted into the second linearly polarized light LP2, and is absorbed in the display module DM.

The second linearly polarized light LP2 which passed through the second retardation film R2 is reflected on the reflective polarizer PR. The second linearly polarized light LP2 reflected on the reflective polarizer PR passes through the second retardation film R2 and is converted into the first circularly polarized light CP1.

Part of the first circularly polarized light CP1 which passed through the second retardation film R2 is reflected and diffracted on the holographic optical element 20. The other first circularly polarized light CP1 passes through the holographic optical element 20. When the first circularly polarized light CP1 is reflected and diffracted on the holographic optical element 20, the light is converted into the second circularly polarized light CP2. The second circularly polarized light CP2 reflected on the holographic optical element 20 passes through the second retardation film R2 and is converted into the first linearly polarized light LP1.

The first circularly polarized light CP1 which passed through the holographic optical element 20 passes through the first retardation film R1 and is converted into the first linearly polarized light LP1.

The first linearly polarized light LP1 which passed through the second retardation film R2 passes through the reflective polarizer PR and is condensed to the eye E of the user by the lens effect of the holographic optical element 20.

In the display device DSP comprising the above configuration, the optical system 4 comprises an optical path in which light passes through the portion between the holographic optical element 20 and the reflective polarizer PR three times. Thus, in the optical system 4, the optical distance between the holographic optical element 20 and the reflective polarizer PR is approximately three times the actual interval between the holographic optical element 20 and the reflective polarizer PR. By this configuration, when the display surface DS of the display module DM is regarded an object, the user can observe an enlarged virtual image of the object formed in the distance via the optical system 4.

Incidentally, a user with poor eyesight cannot clearly see a virtual image in the distance. With respect to such a user, the position of a virtual image needs to be closer to the user. The position of a virtual image can be adjusted by adjusting the interval between the first structure 4A and the second structure 4B. For example, the position of a virtual image can be moved closer to the user by moving the optical position of the display surface DS corresponding to an object to a side moving away from the focal point of the optical system 4.

Thus, according to the embodiment, the present invention can comprise a diopter scale adjustment function which adjusts the visibility of an image in accordance with the eyesight of the user. Further, as shown in FIG. 2, the variable mechanism SL is provided for each of the display device DSPR for the right eye and the display device DSPL for the left eye. Thus, the position of the virtual image of each of the display devices DSPR and DSPL can be independently adjusted. By this configuration, the virtual images of the display devices DSPR and DSPL can be clearly displayed in accordance with the eyesight of the right and left eyes, respectively.

Moreover, when the variable mechanism SL moves the second structure 4B, the second structure 4B does not rotate in a plane. Thus, the transmission axis (or reflective axis) in the reflective polarizer PR does not rotate in a plane. The reduction in display quality caused by axial displacement can be prevented. Further, the reduction in the use efficiency of light can be prevented.

It should be noted that the first linearly polarized light LP1 explained with reference to FIG. 4 may be replaced by the second linearly polarized light LP2, or the first circularly polarized light CP1 may be replaced by the second circularly polarized light CP2.

Here, an example of the adjustment of the position of a virtual image is explained.

Figure 5:
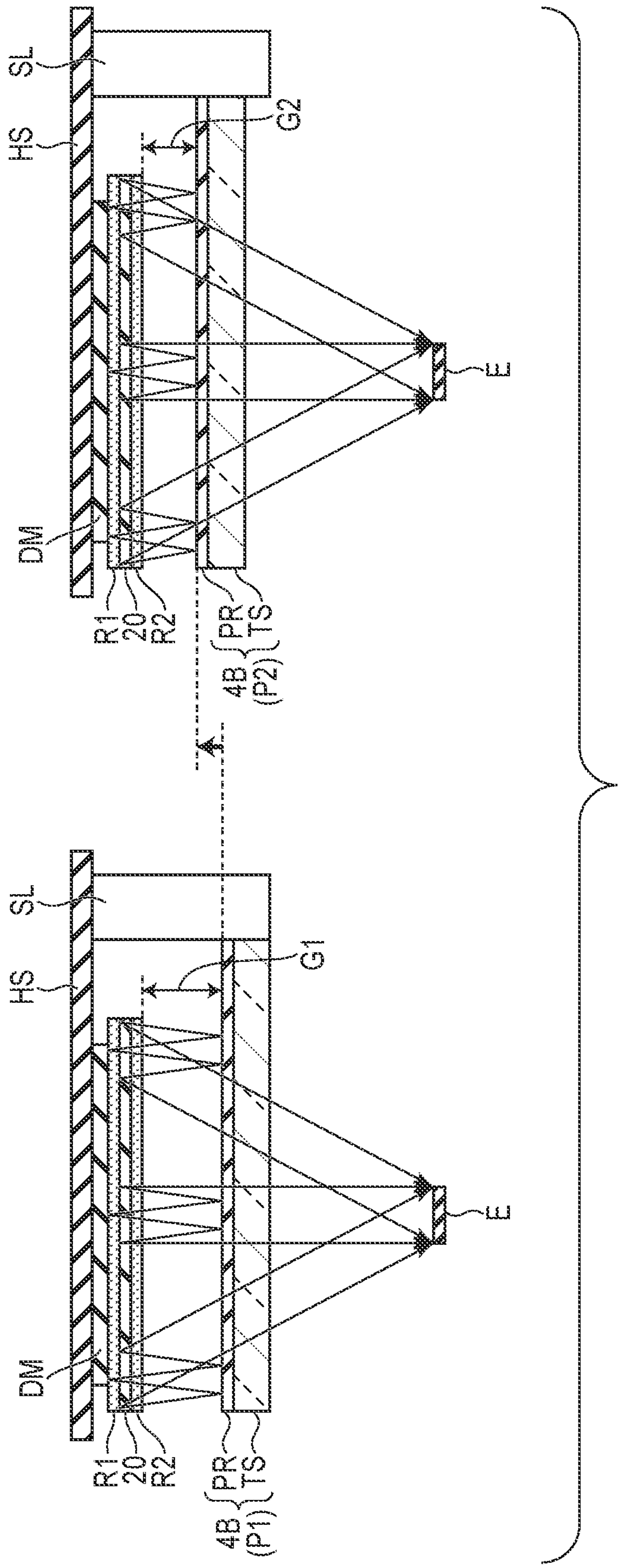
FIG. 5 is a diagram showing the state before and after the move of a second structure 4B.

FIG. 5 is a diagram showing the state before and after the move of the second structure 4B.

The second structure 4B shown here comprises the reflective polarizer PR and the transparent substrate TS.

The left side of the figure shows a state in which the second structure 4B is provided at a first position P1 (before the move). The right side of the figure shows a state in which the second structure 4B is provided at a second position P2 (after the move).

In the state where the second structure 4B is provided at the first position P1, a first interval G1 is defined between the second retardation film R2 and the reflective polarizer PR.

In the state where the second structure 4B is provided at the second position P2, a second interval G2 is defined between the second retardation film R2 and the reflective polarizer PR. The second interval G2 is less than the first interval G1. This state is realized when the variable mechanism SL moves the second structure 4B so as to be closer to the display module DM.

Figure 6:
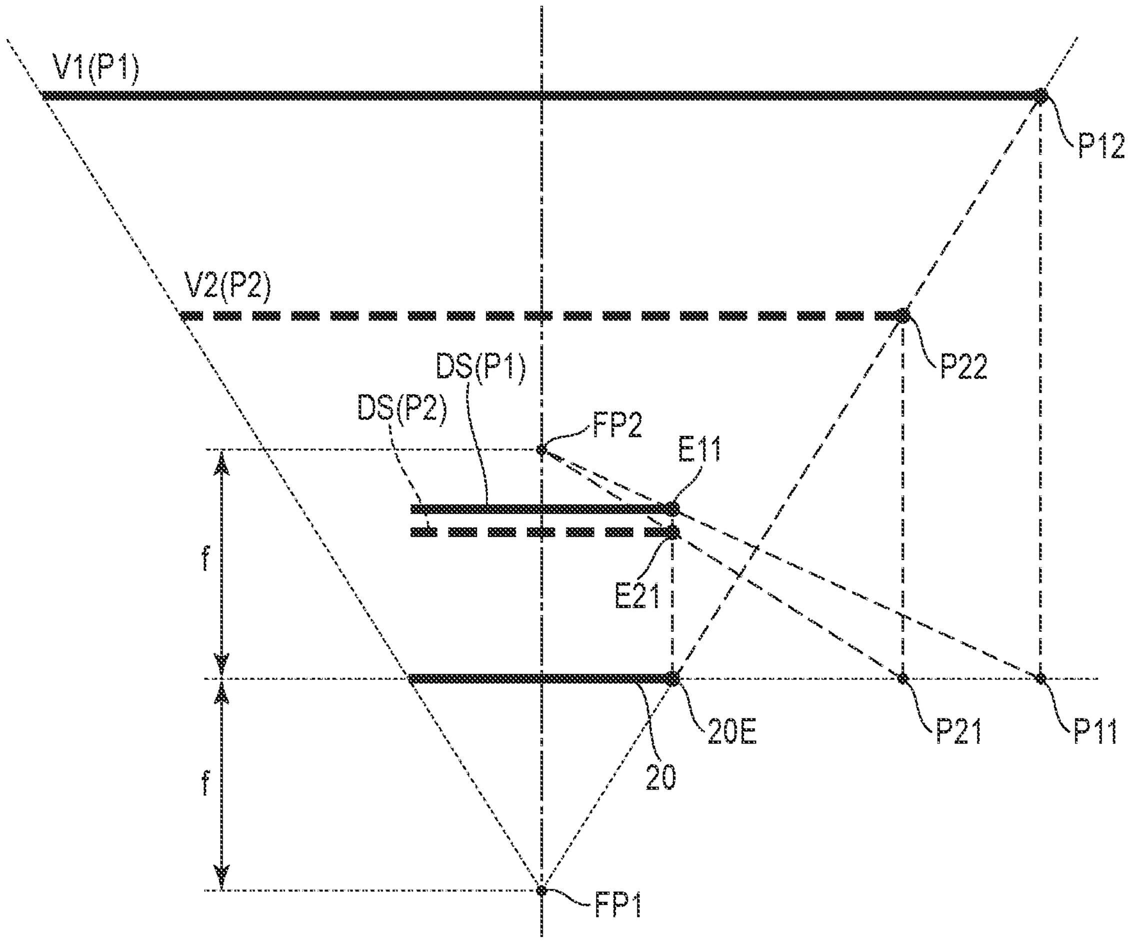
FIG. 6 is a diagram in which the optical system of the display device shown in FIG. 5 is developed at the position of a reflective polarizer PR.

FIG. 6 is a diagram in which the optical system of the display device shown in FIG. 5 is developed at the position of the reflective polarizer PR.

The position having a focal distance f from the holographic optical element 20 to the front side (in other words, the side of the user's eye) is defined as a first focal point FP1. The position having a focal distance f from the holographic optical element 20 to the rear side is defined as a second focal point FP2.

When the second structure 4B is located at the first position P1, the point at which the line passing through an end portion E11 of the display surface DS shown by a solid line and the second focal point FP2 intersects with the position of the holographic optical element 20 is defined as point P11, and the point at which the line passing through an end portion 20E of the holographic optical element 20 and the first focal point FP1 intersects with a perpendicular line passing through point P11 is defined as point P12. At this time, virtual image V1 is formed at the position of point P12 as shown by a solid line.

When the second structure 4B is located at the second position P2, the point at which the line passing through an end portion E21 of the display surface DS shown by a broken line and the second focal point FP2 intersects with the position of the holographic optical element 20 is defined as point P21, and the point at which the line passing through the end portion 20E of the holographic optical element 20 and the first focal point FP1 intersects with a perpendicular line passing through point P21 is defined as point P22. At this time, virtual image V2 is formed at the position of point P22 as shown by a broken line.

In this manner, when the second structure 4B moves to the second position P2, the display surface DS moves away from the second focal point FP2, and the position of virtual image V2 moves closer to the side of the user's eye. Thus, an image which can be clearly viewed can be displayed for a nearsighted user.

Second Configuration Example

Figure 7:
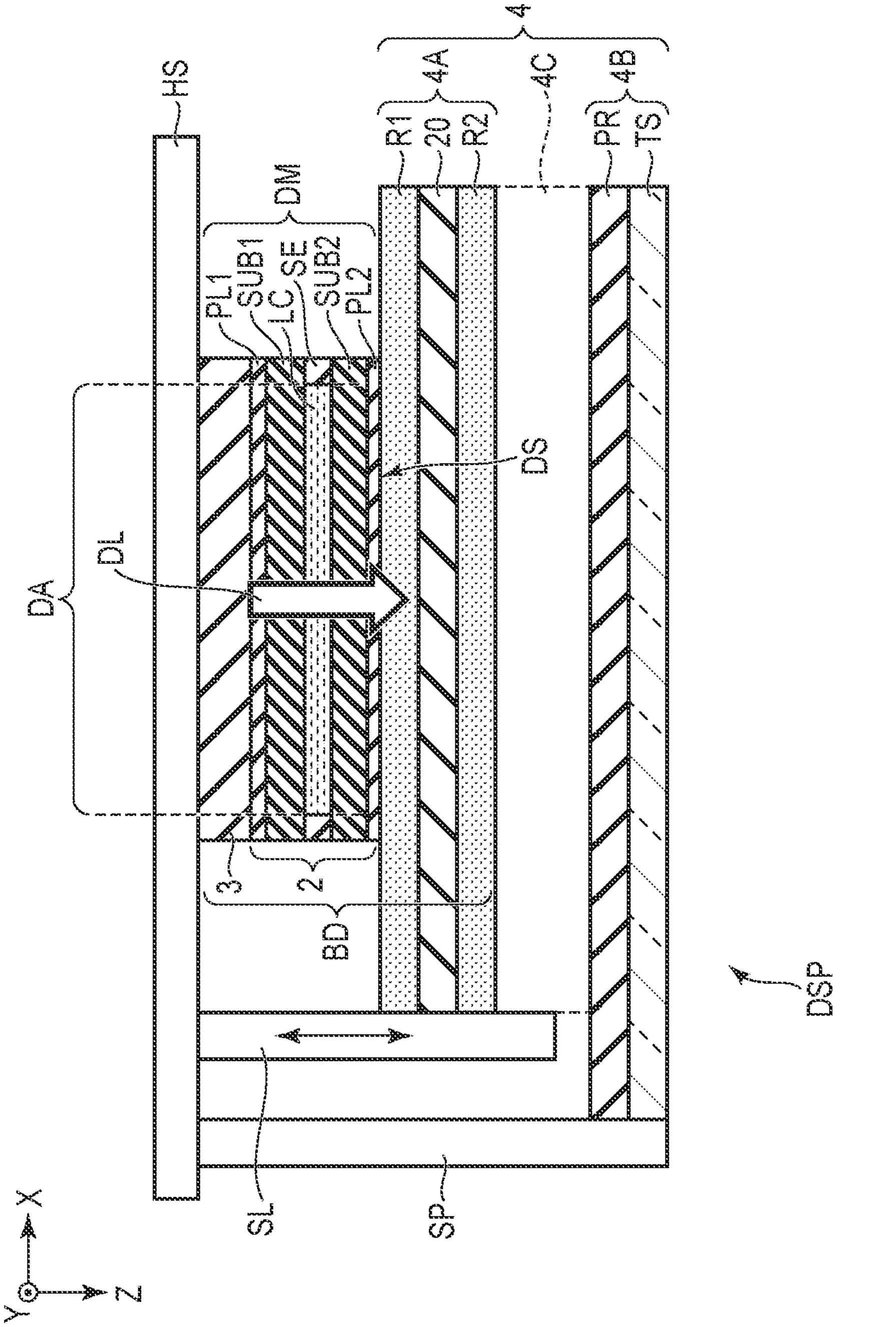
FIG. 7 is a cross-sectional view showing the second configuration example of the display device DSP.

FIG. 7 is a cross-sectional view showing the second configuration example of the display device DSP.

The second configuration example shown in FIG. 7 is different from the first configuration example shown in FIG. 3 in respect that the first structure 4A and the display module DM are supported by the variable mechanism SL, and the second structure 4B is supported by the support body SP. These differences are mainly explained below.

The second structure 4B is supported by the support body SP secured to the housing HS. Thus, the second structure 4B is secured to the housing HS across an intervening constant gap.

The display module DM is provided between the housing HS and the first structure 4A. Although the display module DM is secured to the first structure 4A, the display module DM is not secured to the housing HS. These display module DM and first structure 4A constitute an integral structure BD.

The structure BD (the block of the display module DM and the first structure 4A) is supported by the variable mechanism SL secured to the housing HS. The variable mechanism SL is configured to move the structure BD in the normal direction of the display surface DS. When the structure BD moves, the variable mechanism SL slides the structure BD in the normal direction of the display surface DS without rotating the structure BD in a plane. By this configuration, the interval between the first structure 4A and the second structure 4B (or the interval between the holographic optical element 20 and the reflective polarizer PR) can be changed.

Figure 8:
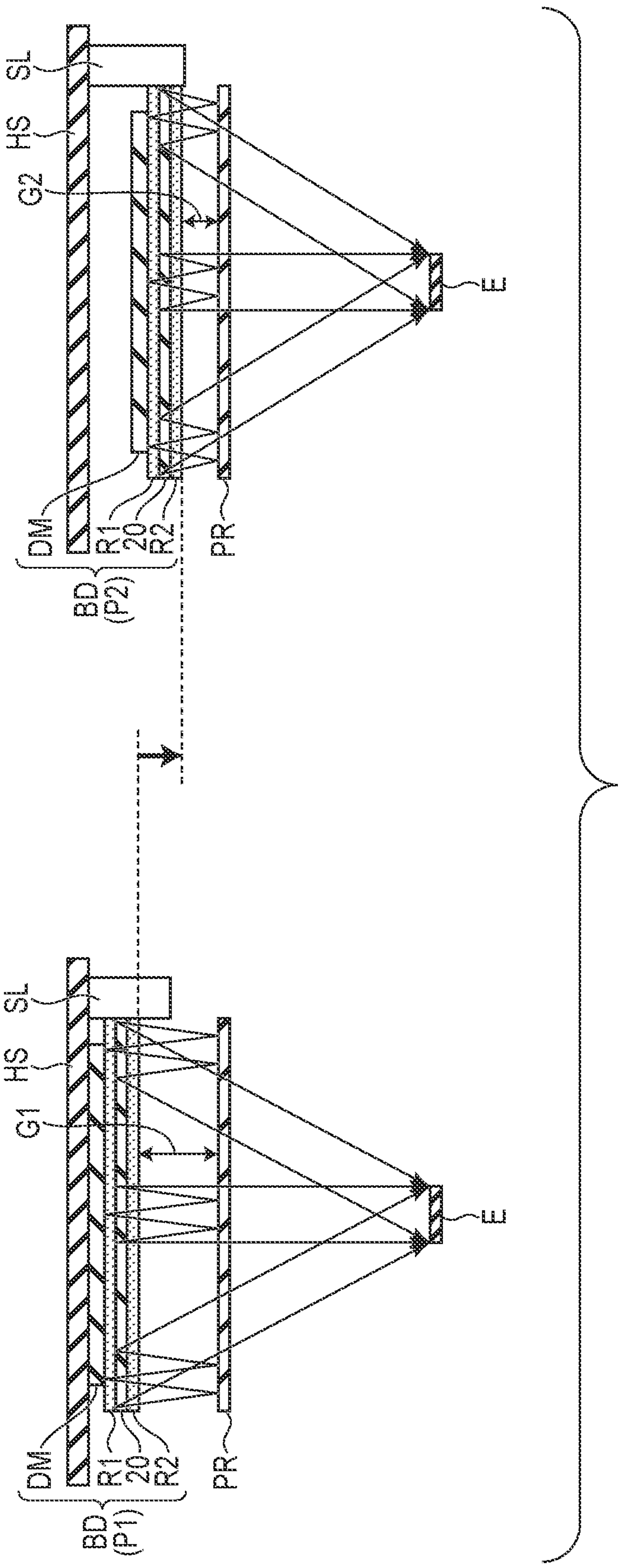
FIG. 8 is a diagram showing the state before and after the move of a structure BD.

FIG. 8 is a diagram showing the state before and after the move of the structure BD.

The structure BD shown here comprises the display module DM, the first retardation film R1, the holographic optical element 20 and the second retardation film R2.

The left side of the figure shows a state in which the structure BD is provided at a first position P1 (before the move). The right side of the figure shows a state in which the structure BD is provided at a second position P2 (after the move).

In the state where the structure BD is provided at the first position P1, a first interval G1 is defined between the second retardation film R2 and the reflective polarizer PR.

In the state where the structure BD is provided at the second position P2, a second interval G2 is defined between the second retardation film R2 and the reflective polarizer PR. The second interval G2 is less than the first interval G1. This state is realized when the variable mechanism SL moves the structure BD so as to be closer to the reflective polarizer PR.

When the optical system 4 is developed in the second configuration example described above, a diagram similar to that explained with reference to FIG. 6 is obtained. Specifically, when the structure BD including the first structure 4A moves to the second position P2, the display surface DS moves away from the second focal point FP2, and the position of virtual image V2 moves closer to the side of the user's eye. Thus, an image which can be clearly viewed can be displayed for a nearsighted user.

Third Configuration Example

Figure 9:
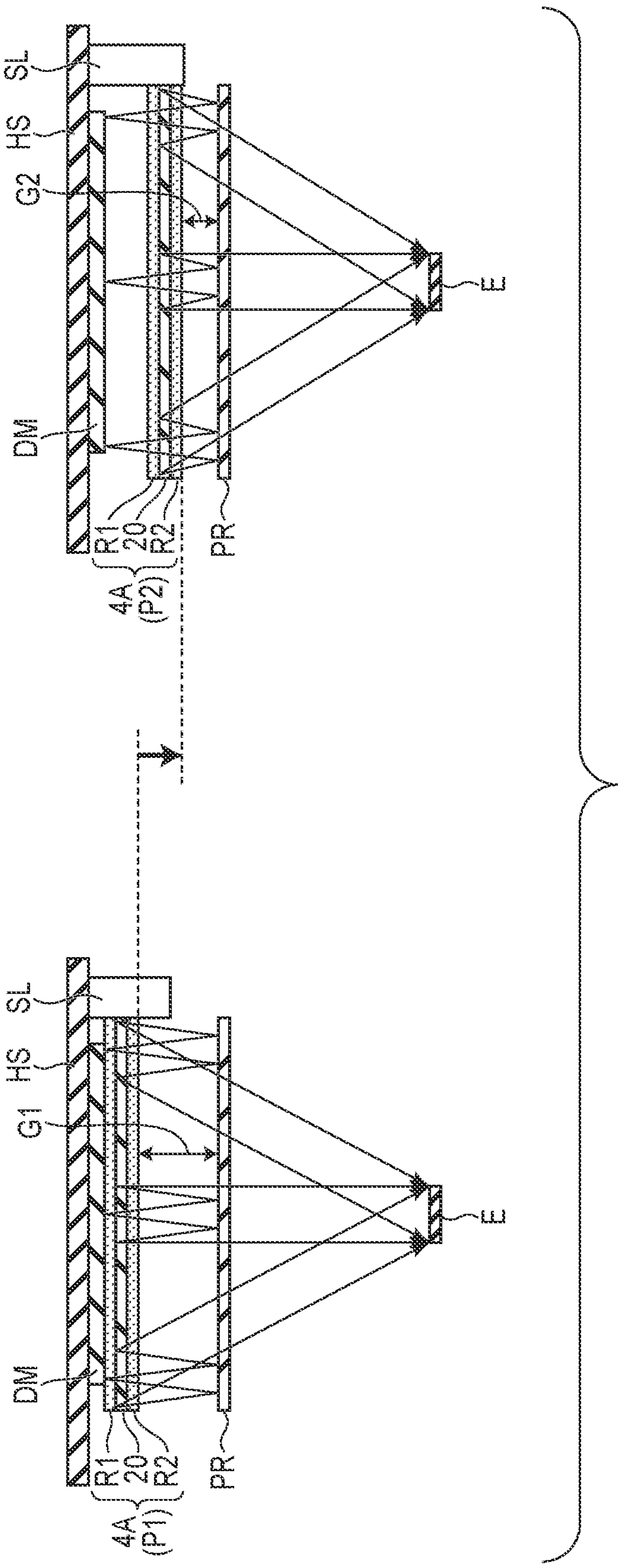
FIG. 9 is a diagram showing the state before and after the move of a first structure 4A.

FIG. 9 is a diagram showing the state before and after the move of the first structure 4A.

The third configuration example is different from the second configuration example shown in FIG. 7 in respect that the display module DM is secured to the housing HS, and the variable mechanism SL is configured to move the first structure 4A.

The first structure 4A shown here comprises the first retardation film R1, the holographic optical element 20 and the second retardation film R2.

The left side of the figure shows a state in which the first structure 4A is provided at a first position P1 (before the move). The right side of the figure shows a state in which the first structure 4A is provided at a second position P2 (after the move).

In the state where the first structure 4A is provided at the first position P1, a first interval G1 is defined between the second retardation film R2 and the reflective polarizer PR.

In the state where the first structure 4A is provided at the second position P2, a second interval G2 is defined between the second retardation film R2 and the reflective polarizer PR. The second interval G2 is less than the first interval G1. This state is realized when the variable mechanism SL moves the first structure 4A so as to be closer to the reflective polarizer PR.

When the optical system 4 is developed in the third configuration example described above, a diagram similar to that explained with reference to FIG. 6 is obtained. Specifically, when the first structure 4A moves to the second position P2, the display surface DS moves away from the second focal point FP2, and the position of virtual image V2 moves closer to the side of the user's eye. Thus, an image which can be clearly viewed can be displayed for a nearsighted user.

Fourth Configuration Example

Figure 10:
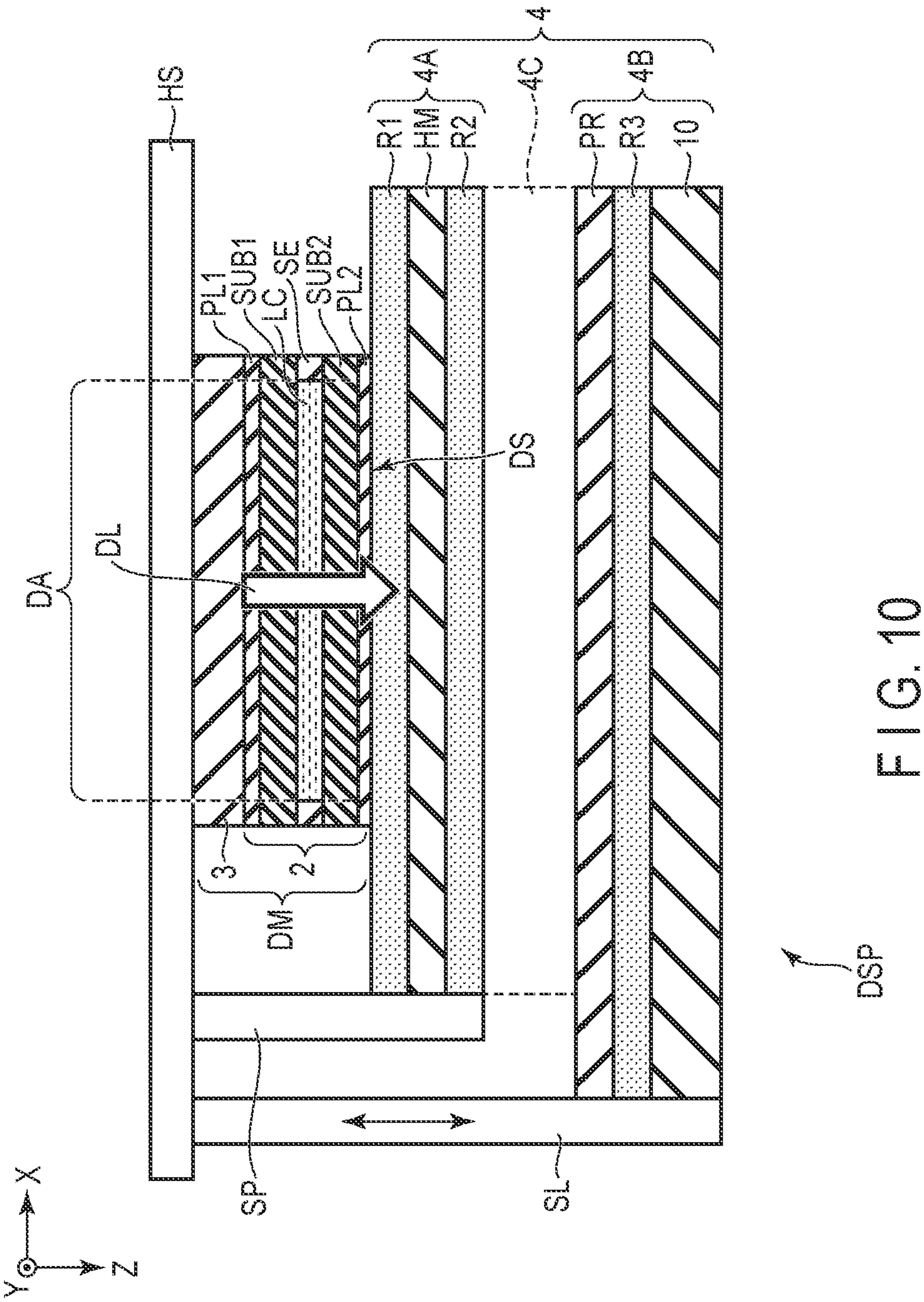
FIG. 10 is a cross-sectional view showing the fourth configuration example of the display device DSP.

FIG. 10 is a cross-sectional view showing the fourth configuration example of the display device DSP.

The display device DSP explained here can be applied to each of the display devices DSPR and DSPL described above.

The display module DM comprises the display panel 2 and the illumination device 3. As the configuration of the display panel 2 is the same as the first configuration example, explanation of the configuration is omitted by adding the same reference numbers.

The optical system 4 comprises the first structure 4A and the second structure 4B. The first structure 4A is spaced apart from the second structure 4B in the normal direction of the display surface DS. The aerial layer 4C is interposed between the first structure 4A and the second structure 4B. The display panel 2 is provided between the illumination device 3 and the first structure 4A. The first structure 4A is provided between the display panel 2 and the second structure 4B (or between the display panel 2 and the aerial layer 4C).

The first structure 4A comprises the first retardation film R1 facing the display module DM, a semi-transmissive layer HM facing the first retardation film R1, and the second retardation film R2 facing the semi-transmissive layer HM. The semi-transmissive layer HM is located between the first retardation film R1 and the second retardation film R2. For example, the first retardation film R1, the semi-transmissive layer HM and the second retardation film R2 are attached to each other.

The first retardation film R1 and the second retardation film R2 are quarter-wave plates and impart a quarter-wave retardation to the light which passes through the retardation films.

The semi-transmissive layer HM transmits part of incident light and reflects the other light. For example, the semi-transmissive layer HM is a thin film formed of a metal material such as aluminum or silver. The transmittance of the semi-transmissive layer HM is approximately 50%.

The second structure 4B comprises the reflective polarizer PR facing the second retardation film R2, a third retardation film R3 facing the reflective polarizer PR, and a liquid crystal element 10 facing the third retardation film. The third retardation film R3 is located between the reflective polarizer PR and the liquid crystal element 10. For example, the reflective polarizer PR, the third retardation film R3 and the liquid crystal element 10 are attached to each other. The aerial layer 4C is interposed between the second retardation film R2 and the reflective polarizer PR.

Of the incident light, the reflective polarizer PR transmits the first linearly polarized light and reflects the second linearly polarized light orthogonal to the first linearly polarized light.

The third retardation film R3 is a quarter-wave plate and imparts a quarter-wave retardation to the light which passes through the retardation film.

The crystal element 10 imparts a half-wave retardation to light having a specific wavelength and has a lens effect of condensing the first circularly polarized light. Here, as an example of an element having a lens effect of condensing circularly polarized light, the liquid crystal element 10 is shown. However, the element is not limited to an element using a liquid crystal as long as the element has a similar lens effect.

The variable mechanism SL and the support body SP are secured to the housing HS.

The first structure 4A is supported by the support body SP and is secured to the housing HS across an intervening constant gap. The display module DM is provided between the housing HS and the first structure 4A. In this configuration, the display module DM and the first structure 4A are held without moving in the normal direction of the display surface DS relative to the housing HS.

The second structure 4B is supported by the variable mechanism SL. The variable mechanism SL is configured to move the second structure 4B in the normal direction of the display surface DS. When the second structure 4B moves, the variable mechanism SL slides the second structure 4B in the normal direction of the display surface DS without rotating the second structure 4B in a plane. By this configuration, the interval between the first structure 4A and the second structure 4B can be changed.

Figure 11:
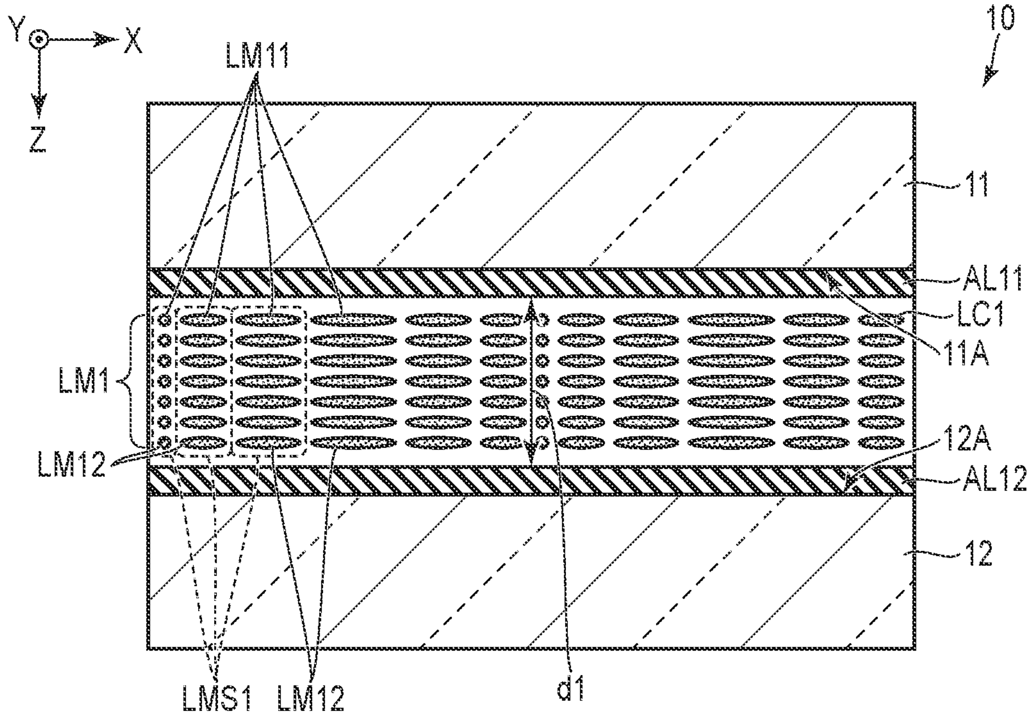
FIG. 11 is a cross-sectional view showing an example of the liquid crystal element 10 shown in FIG. 10.

FIG. 11 is a cross-sectional view showing an example of the liquid crystal element 10 shown in FIG. 10.

The liquid crystal element 10 comprises a substrate 11, an alignment film AL11, a liquid crystal layer (first liquid crystal layer) LC1, an alignment film AL12 and a substrate 12.

Each of the substrates 11 and 12 is a transparent substrate which transmits light, and is, for example, a glass substrate or a resinous substrate. The substrate 11 is attached to, for example, the third retardation film R3 shown in FIG. 10. However, the substrate 11 may be replaced by the third retardation film R3.

The alignment film AL11 is provided on the inner surface 11A of the substrate 11. In the example shown in FIG. 11, the alignment film AL11 is in contact with the substrate 11. However, a thin film may be interposed between the alignment film AL11 and the substrate 11.

The alignment film AL12 is provided on the inner surface 12A of the substrate 12. In the example shown in FIG. 11, the alignment film AL12 is in contact with the substrate 12. However, a thin film may be interposed between the alignment film AL12 and the substrate 12. The alignment film AL12 faces the alignment film AL11 in a third direction Z.

The alignment films AL11 and AL12 are formed of, for example, polyimide, and are both horizontal alignment films having an alignment restriction force parallel to the X-Y plane.

The liquid crystal layer LC1 is provided between the alignment films AL11 and AL12, and is in contact with the alignment films AL11 and AL12. The liquid crystal layer LC1 has thickness d1 in the third direction Z. The liquid crystal layer LC1 comprises nematic liquid crystals in which the alignment direction parallel to the third direction Z is uniform.

In other words, the liquid crystal layer LC1 comprises a plurality of liquid crystal structures LMS1. When this specification focuses on a liquid crystal structure LMS1, the liquid crystal structure LMS1 comprises a liquid crystal molecule LM11 located at an end of the liquid crystal structure LMS1, and a liquid crystal molecule LM12 located at the other end. The liquid crystal molecule LM11 is close to the alignment film AL11, and the liquid crystal molecule LM12 is close to the alignment film AL12. The alignment direction of the liquid crystal molecule LM11 is substantially coincident with the alignment direction of the liquid crystal molecule LM12. The alignment direction of another liquid crystal molecule LM1 between the liquid crystal molecule LM11 and the liquid crystal molecule LM12 is also substantially coincident with the alignment direction of the liquid crystal molecule LM11. Here, the alignment direction of each liquid crystal molecule LM1 corresponds to the direction of the long axis of the liquid crystal molecule in the X-Y plane.

In the liquid crystal layer LC1, a plurality of liquid crystal structures LMS1 which are adjacent to each other in a first direction X have alignment directions different from each other. Similarly, a plurality of liquid crystal structures LMS1 which are adjacent to each other in a second direction Y have alignment directions different from each other. The alignment directions of the liquid crystal molecules LM11 arranged along the alignment film AL11 and the alignment directions of the liquid crystal molecules LM12 arranged along the alignment film AL12 successively (or linearly) change.

This liquid crystal layer LC1 is cured in a state where the alignment directions of the liquid crystal molecules LM1 including the liquid crystal molecules LM11 and the liquid crystal molecules LM12 are fixed. In other words, an electric field does not control the alignment directions of the liquid crystal molecules LM1. Thus, the liquid crystal element 10 does not comprise an electrode for alignment control.

When the refractive anisotropy or double refraction property of the liquid crystal layer LC1 (the difference between refractive index ne for extraordinary light and refractive index no for ordinary light in the liquid crystal layer LC1)

is defined as Δn, the retardation Δn·d1 of the liquid crystal layer LC1 is set so as to be half a specific wavelength λ.

Figure 12:
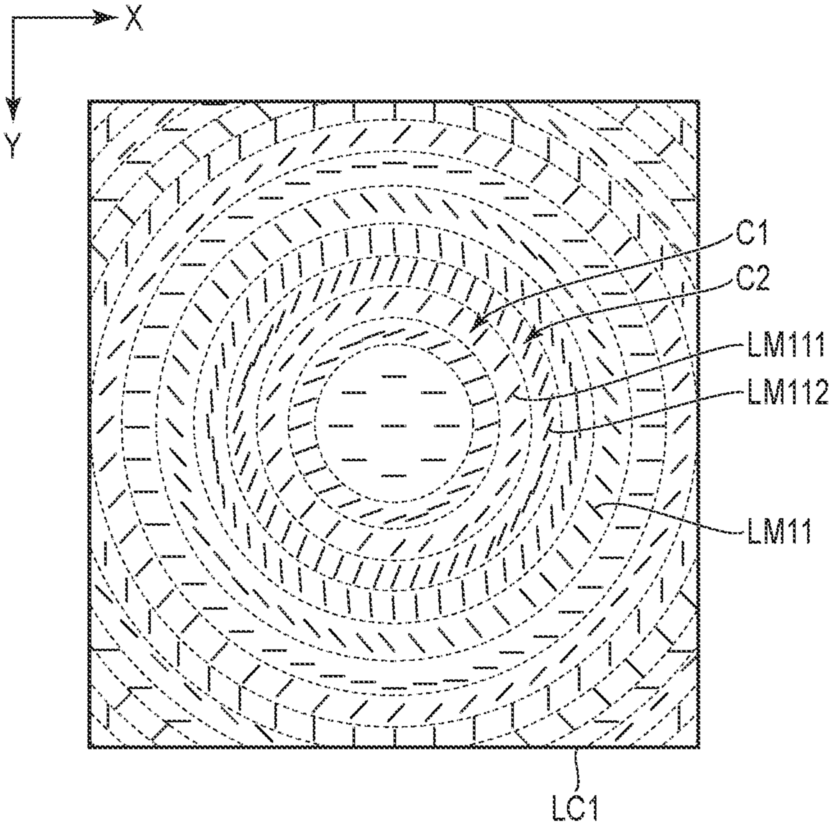
FIG. 12 is a plan view showing an example of the alignment pattern in the liquid crystal layer LC1 shown in FIG. 11.

FIG. 12 is a plan view showing an example of the alignment pattern in the liquid crystal layer LC1 shown in FIG. 11.

FIG. 12 shows an example of a spacial phase in the X-Y plane of the liquid crystal layer LC1. Here, spacial phases are shown as the alignment directions of the liquid crystal molecules LM11 close to the alignment film AL11 among the liquid crystal molecules LM1 included in each liquid crystal structure LMS1.

In each concentric circle shown by a dotted line in the figure, the spacial phase is uniform. In an annular area surrounded by two adjacent concentric circles, the alignment directions of the liquid crystal molecules LM11 are uniform. However, between adjacent annular areas, the alignment directions of the liquid crystal molecules LM11 are different from each other.

As seen in plan view, the liquid crystal layer LC1 comprises a first annular area C1 and a second annular area C2. The second annular area C2 is located on the external side relative to the first annular area C1. The first annular area C1 consists of first liquid crystal molecules LM111 aligned in the same direction. The second annular area C2 consists of second liquid crystal molecules LM112 aligned in the same direction. The alignment direction of the first liquid crystal molecules LM111 is different from that of the second liquid crystal molecules LM112.

Similarly, the alignment directions of the liquid crystal molecules LM11 arranged in the radial direction from the area of the center of the concentric circles are different from each other and sequentially change. In other words, in the X-Y plane shown in the figure, the spacial phase of the liquid crystal layer LC1 differs in the radial direction and sequentially changes.

When the first circularly polarized light enters the liquid crystal element 10 comprising the above configuration, the first circularly polarized light is condensed toward the center of the concentric circles, and further, the transmitted light of the liquid crystal element 10 is converted into the second circularly polarized light which rotates in the opposite direction of the first circularly polarized light.

Figure 13:
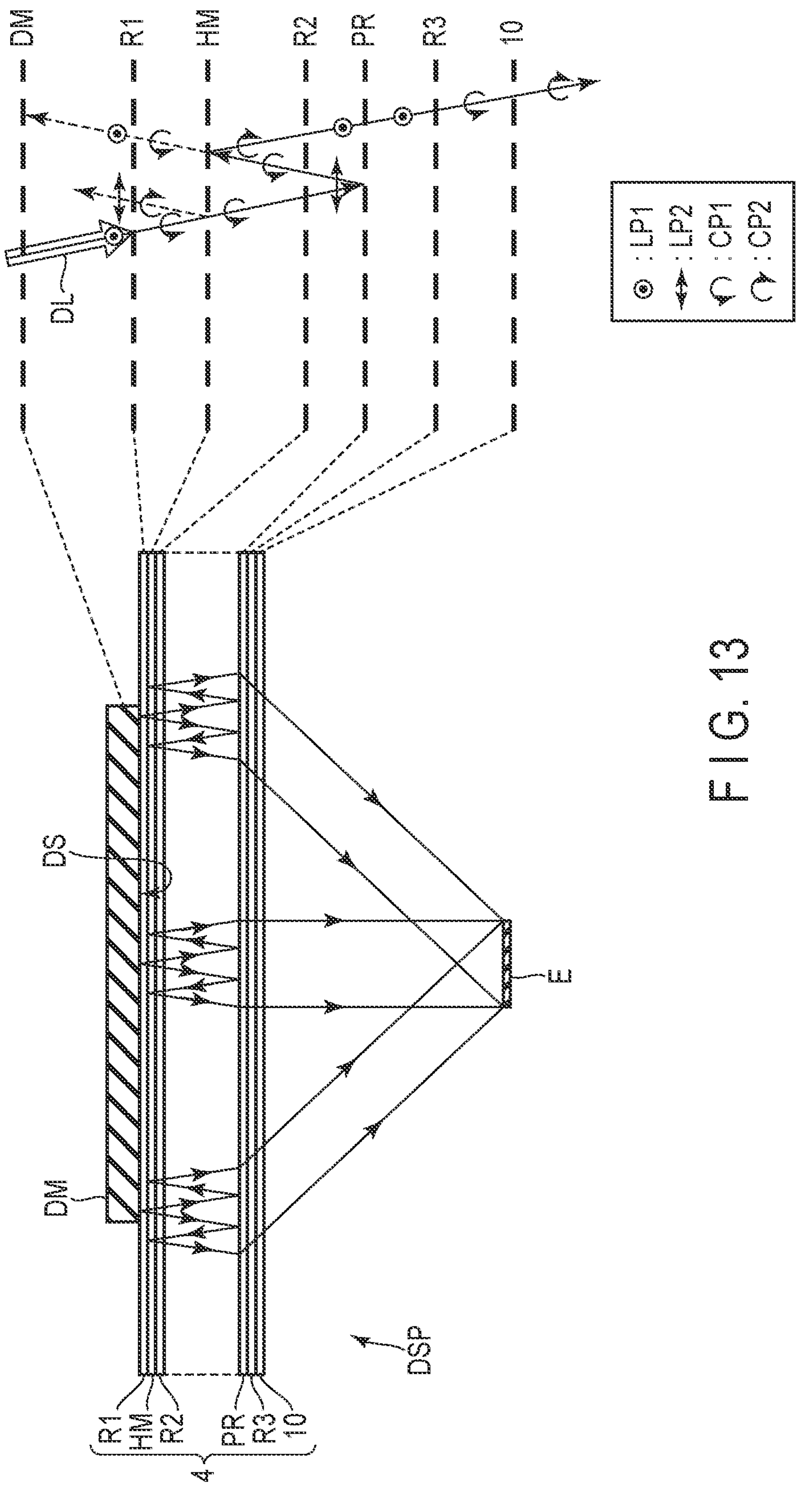
FIG. 13 is a diagram for explaining the optical effect of the display device DSP.

FIG. 13 is a diagram for explaining the optical effect of the display device DSP.

First, the display module DM emits display light DL which is the first linearly polarized light LP1 from the display surface DS. The display light DL passes through the first retardation film R1 and is converted into the first circularly polarized light CP1.

Part of the first circularly polarized light CP1 which passed through the first retardation film R1 passes through the semi-transmissive layer HM. The other first circularly polarized light CP1 is reflected on the semi-transmissive layer HM. The first circularly polarized light CP1 which passed through the semi-transmissive layer HM passes through the second retardation film R2 and is converted into the second linearly polarized light LP2.

When the first circularly polarized light CP1 is reflected on the semi-transmissive layer HM, the first circularly polarized light CP1 is converted into the second circularly polarized light CP2 which rotates in the opposite direction of the first circularly polarized light CP1. The second circularly polarized light CP2 reflected on the semi-transmissive layer HM passes through the first retardation film R1, is converted into the second linearly polarized light LP2, and is absorbed in the display module DM.

The second linearly polarized light LP2 which passed through the second retardation film R2 is reflected on the reflective polarizer PR. The second linearly polarized light LP2 reflected on the reflective polarizer PR passes through the second retardation film R2 and is converted into the first circularly polarized light CP1.

Part of the first circularly polarized light CP1 which passed through the second retardation film R2 is reflected on the semi-transmissive layer HM. The other first circularly polarized light CP1 passes through the semi-transmissive layer HM. When the first circularly polarized light CP1 is reflected on the semi-transmissive layer HM, the first circularly polarized light CP1 is converted into the second circularly polarized light CP2. The second circularly polarized light CP2 reflected on the semi-transmissive layer HM passes through the second retardation film R2 and is converted into the first linearly polarized light LP1.

The first circularly polarized light CP1 which passed through the semi-transmissive layer HM passes through the first retardation film R1 and is converted into the first linearly polarized light LP1.

The first linearly polarized light LP1 which passed through the second retardation film R2 passes through the reflective polarizer PR, and further passes through the third retardation film R3, and is converted into the first circularly polarized light CP1. The first circularly polarized light CP1 which passed through the third retardation film R3 is converted into the second circularly polarized light CP2 in the liquid crystal element 10 and is condensed to the eye E of the user by a lens effect.

In this fourth configuration example, effects similar to those of the first configuration example are obtained.

It should be noted that the first linearly polarized light LP1 explained with reference to FIG. 13 may be replaced by the second linearly polarized light LP2, or the first circularly polarized light CP1 may be replaced by the second circularly polarized light CP2.

Here, an example of the adjustment of the position of a virtual image is explained.

Figure 14:
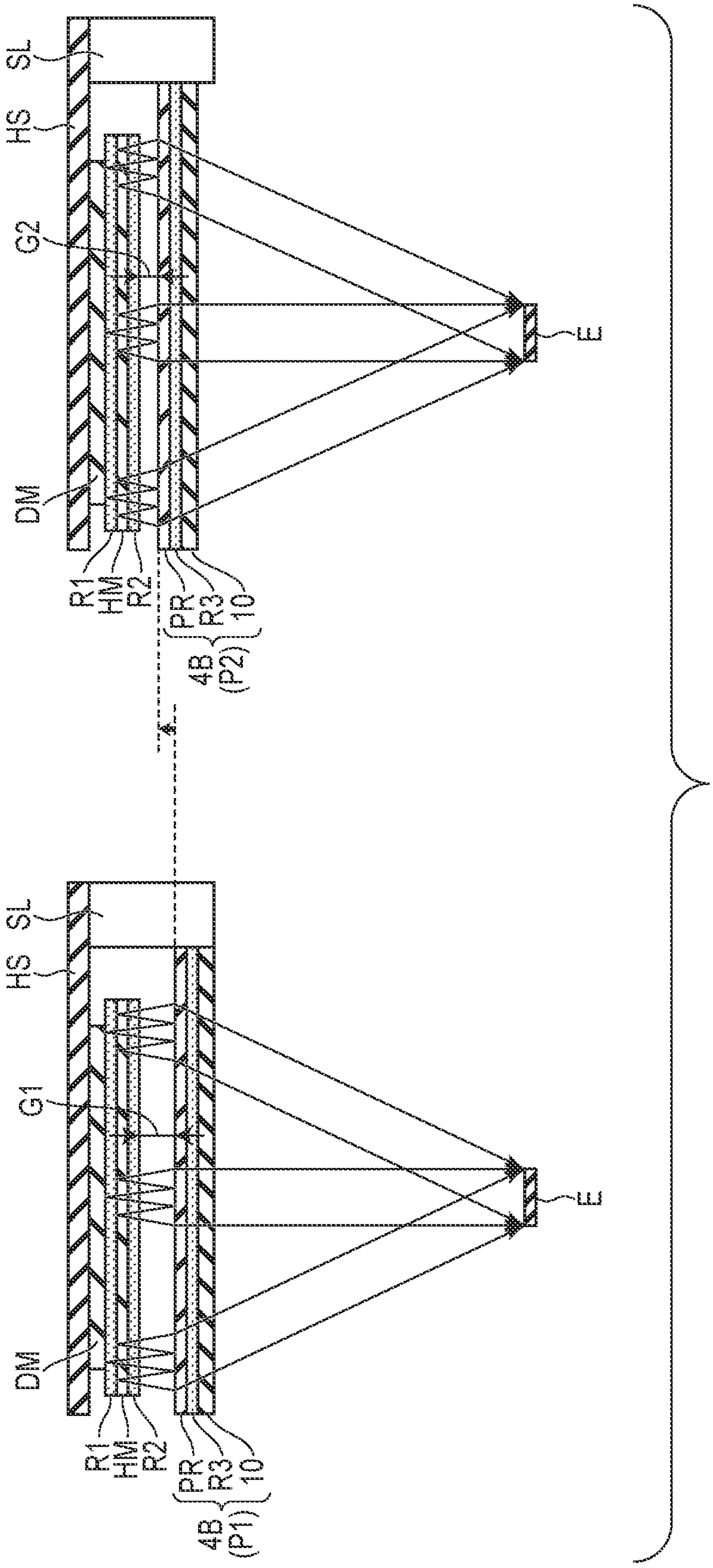
FIG. 14 is a diagram showing the state before and after the move of the second structure 4B.

FIG. 14 is a diagram showing the state before and after the move of the second structure 4B.

The second structure 4B shown here comprises the reflective polarizer PR, the third retardation film R3 and the liquid crystal element 10.

The left side of the figure shows a state in which the second structure 4B is provided at a first position P1 (before the move). The right side of the figure shows a state in which the second structure 4B is provided at a second position P2 (after the move).

In the state where the second structure 4B is provided at the first position P1, a first interval G1 is defined between the second retardation film R2 and the reflective polarizer PR.

In the state where the second structure 4B is provided at the second position P2, a second interval G2 is defined between the second retardation film R2 and the reflective polarizer PR. The second interval G2 is less than the first interval G1. This state is realized when the variable mechanism SL moves the second structure 4B so as to be closer to the display module DM.

Figure 15:
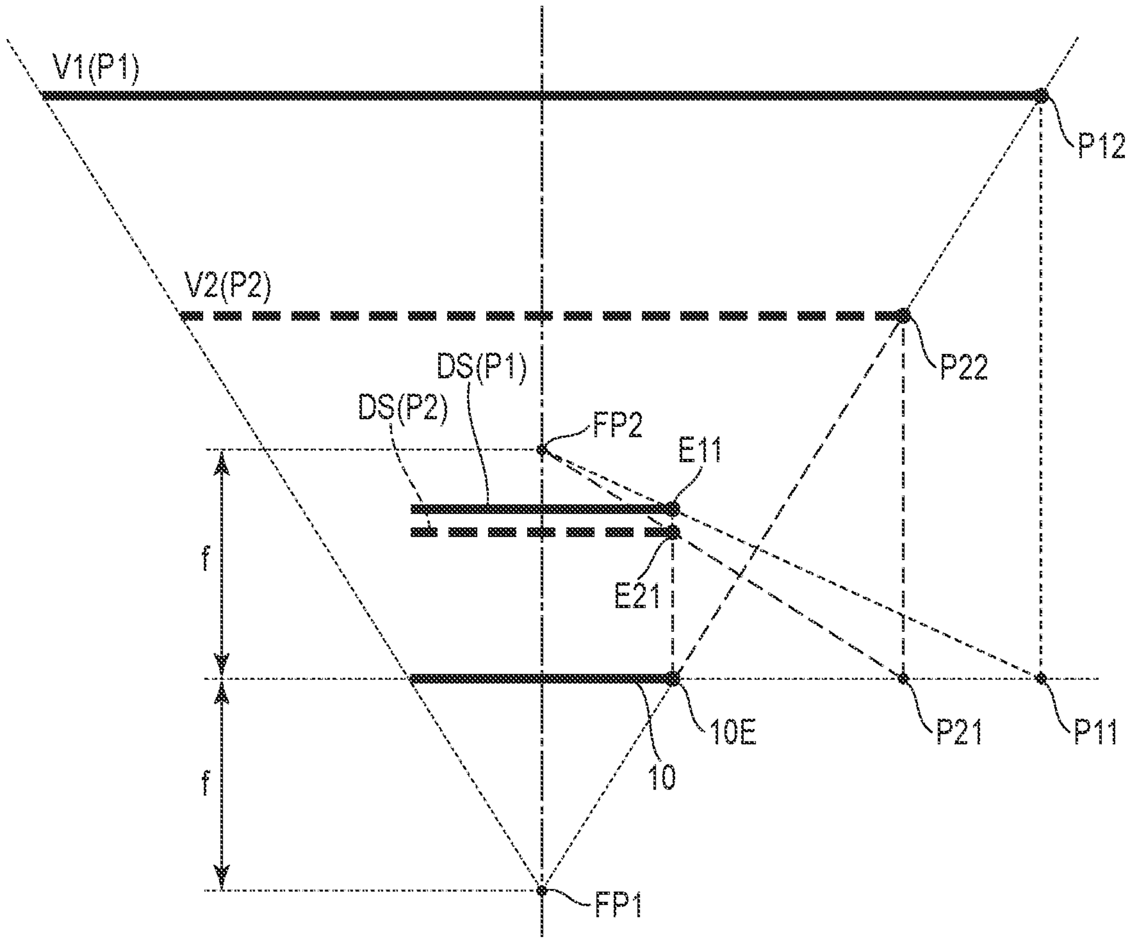
FIG. 15 is a diagram in which the optical system of the display device shown in FIG. 14 is developed at the positions of the reflective polarizer PR and a semi-transmissive layer HM.

FIG. 15 is a diagram in which the optical system of the display device shown in FIG. 14 is developed at the positions of the reflective polarizer PR and the semi-transmissive layer HM.

The position having a focal distance f from the liquid crystal element 10 to the front side (in other words, the side of the user's eye) is defined as a first focal point FP1. The position having a focal distance f from the liquid crystal element 10 to the rear side is defined as a second focal point FP2.

When the second structure 4B is located at the first position P1, the point at which the line passing through an end portion E11 of the display surface DS shown by a solid line and the second focal point FP2 intersects with the position of the liquid crystal element 10 is defined as point P11, and the point at which the line passing through an end portion 10E of the liquid crystal element 10 and the first focal point FP1 intersects with a perpendicular line passing through point P11 is defined as point P12. At this time, virtual image V1 is formed at the position of point P12 as shown by a solid line.

When the second structure 4B is located at the second position P2, the point at which the line passing through an end portion E21 of the display surface DS shown by a broken line and the second focal point FP2 intersects with the position of the liquid crystal element 10 is defined as point P21, and the point at which the line passing through the end portion 10E of the liquid crystal element 10 and the first focal point FP1 intersects with a perpendicular line passing through point P21 is defined as point P22. At this time, virtual image V2 is formed at the position of point P22 as shown by a broken line.

In this manner, when the second structure 4B moves to the second position P2, the display surface DS moves away from the second focal point FP2, and the position of virtual image V2 moves closer to the side of the user's eye. Thus, an image which can be clearly viewed can be displayed for a nearsighted user.

Fifth Configuration Example

Figure 16:
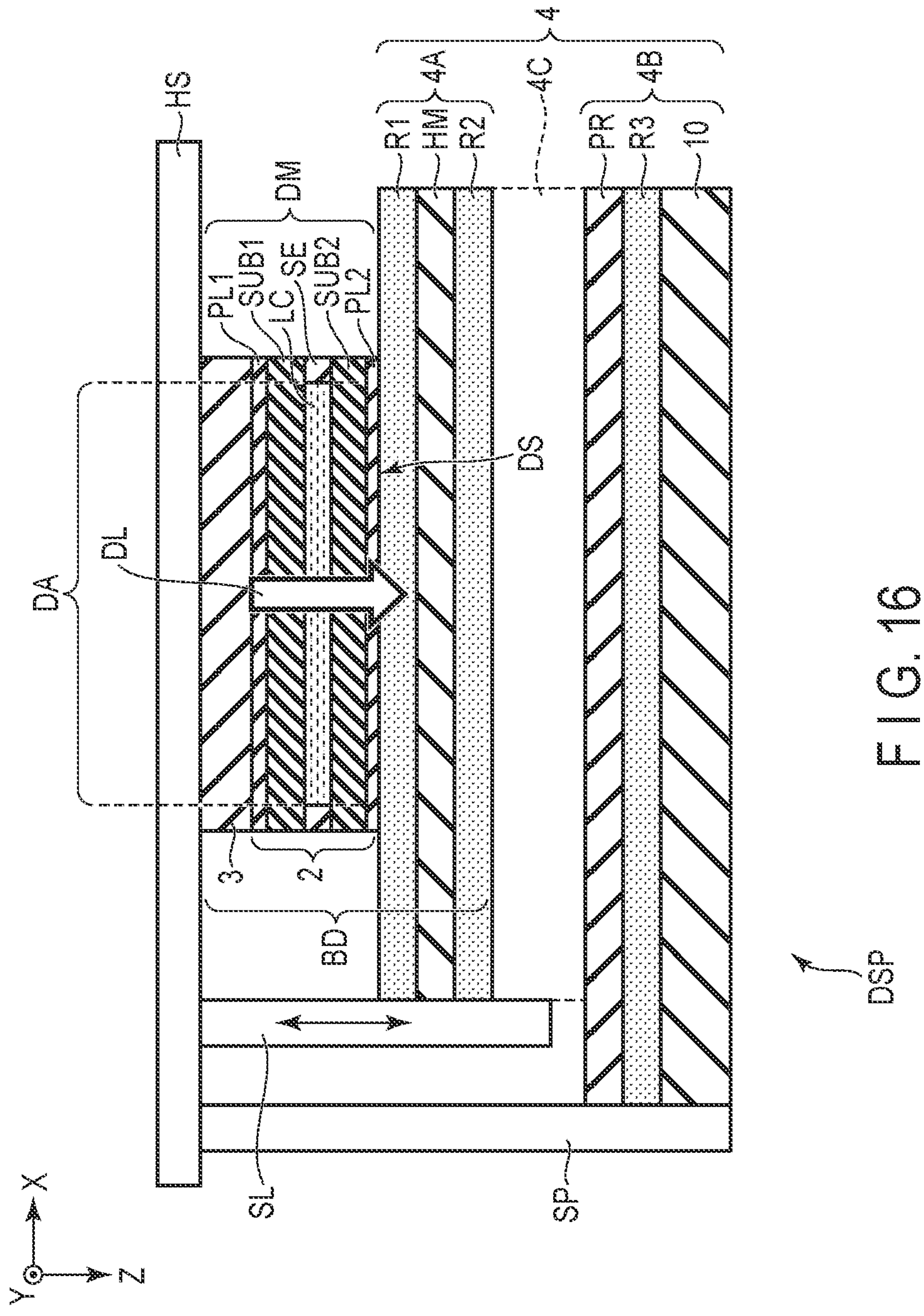
FIG. 16 is a cross-sectional view showing the fifth configuration example of the display device DSP.

FIG. 16 is a cross-sectional view showing the fifth configuration example of the display device DSP.

The fifth configuration example shown in FIG. 16 is different from the fourth configuration example shown in FIG. 10 in respect that the first structure 4A and the display module DM are supported by the variable mechanism SL, and the second structure 4B is supported by the support body SP. These differences are mainly explained below.

The second structure 4B is supported by the support body SP secured to the housing HS. Thus, the second structure 4B is secured to the housing HS across an intervening constant gap.

The display module DM is provided between the housing HS and the first structure 4A. Although the display module DM is secured to the first structure 4A, the display module DM is not secured to the housing HS. These display module DM and first structure 4A constitute the integral structure BD.

The structure BD (the block of the display module DM and the first structure 4A) is supported by the variable mechanism SL secured to the housing HS. The variable mechanism SL is configured to move the structure BD in the normal direction of the display surface DS. When the structure BD moves, the variable mechanism SL slides the structure BD in the normal direction of the display surface DS without rotating the structure BD in a plane. By this configuration, the interval between the first structure 4A and the second structure 4B (or the interval between the semi-transmissive layer HM and the reflective polarizer PR) can be changed.

Figure 17:
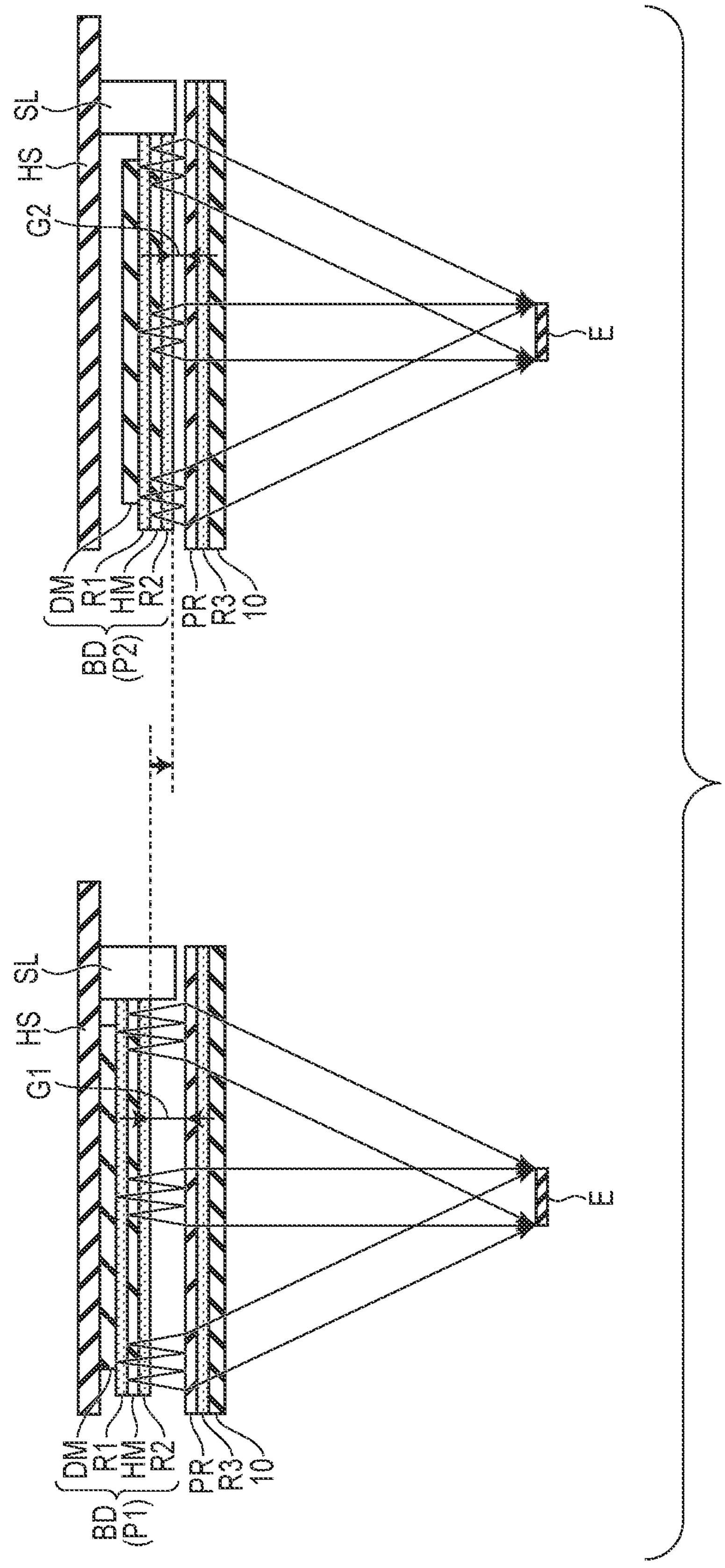
FIG. 17 is a diagram showing the state before and after the move of the structure BD.

FIG. 17 is a diagram showing the state before and after the move of the structure BD.

The structure BD shown here comprises the display module DM, the first retardation film R1, the semi-transmissive layer HM and the second retardation film R2.

The left side of the figure shows a state in which the structure BD is provided at a first position P1 (before the move). The right side of the figure shows a state in which the structure BD is provided at a second position P2 (after the move).

In the state where the structure BD is provided at the first position P1, a first interval G1 is defined between the second retardation film R2 and the reflective polarizer PR.

In the state where the structure BD is provided at the second position P2, a second interval G2 is defined between the second retardation film R2 and the reflective polarizer PR. The second interval G2 is less than the first interval G1. This state is realized when the variable mechanism SL moves the structure BD so as to be closer to the reflective polarizer PR.

When the optical system 4 is developed in the fifth configuration example described above, a diagram similar to that explained with reference to FIG. 15 is obtained. Specifically, when the structure BD including the first structure 4A moves to the second position P2, the display surface DS moves away from the second focal point FP2, and the position of virtual image V2 moves closer to the side of the user's eye. Thus, an image which can be clearly viewed can be displayed for a nearsighted user.

Sixth Configuration Example

Figure 18:
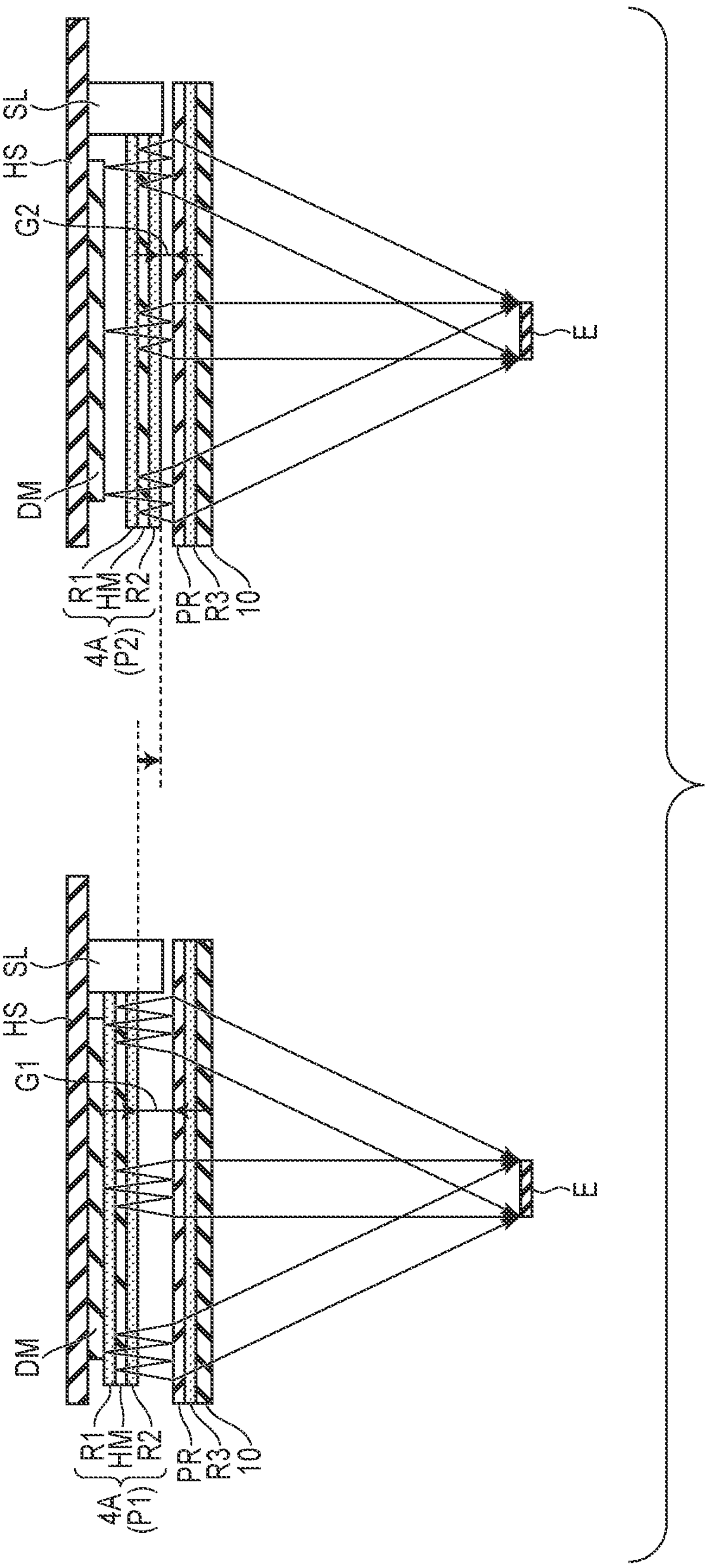
FIG. 18 is a diagram showing the state before and after the move of the first structure 4A.

FIG. 18 is a diagram showing the state before and after the move of the first structure 4A.

The sixth configuration example is different from the fifth configuration example shown in FIG. 16 in respect that the display module DM is secured to the housing HS, and the variable mechanism SL is configured to move the first structure 4A.

The first structure 4A shown here comprises the first retardation film R1, the semi-transmissive layer HM and the second retardation film R2.

The left side of the figure shows a state in which the first structure 4A is provided at a first position P1 (before the move). The right side of the figure shows a state in which the first structure 4A is provided at a second position P2 (after the move).

In the state where the first structure 4A is provided at the first position P1, a first interval G1 is defined between the second retardation film R2 and the reflective polarizer PR.

In the state where the first structure 4A is provided at the second position P2, a second interval G2 is defined between the second retardation film R2 and the reflective polarizer PR. The second interval G2 is less than the first interval G1. This state is realized when the variable mechanism SL moves the first structure 4A so as to be closer to the reflective polarizer PR.

When the optical system 4 is developed in the sixth configuration example described above, a diagram similar to that explained with reference to FIG. 15 is obtained. Specifically, when the first structure 4A moves to the second position P2, the display surface DS moves away from the second focal point FP2, and the position of virtual image V2 moves closer to the side of the user's eye. Thus, an image which can be clearly viewed can be displayed for a nearsighted user.

As explained above, the embodiment can provide a display device comprising a diopter scale adjustment function.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:

a housing having an upper surface and the lower surface;

a display module facing the housing and configured to emit display light which is linearly polarized light;

a first structure comprising a first retardation film facing the display module, a holographic optical element attached to the first retardation film, and a second retardation film attached to the holographic optical element;

a second structure comprising a reflective polarizer facing the second retardation film, and a transparent substrate facing-attached to the reflective polarizer;

a support body secured to the housing and supporting one of the first structure or the second structure;

a variable mechanism supporting the other one of the first structure or the second structure by which an interval between the first structure and the second structure is made variable; and an aerial layer interposed between the first structure and the second structure and extending to the lower surface of the housing.

2. The display device of claim 1, wherein each of the first retardation film and the second retardation film is a quarter-wave plate.

3. The display device of claim 1, wherein the first structure is supported by the support body, the display module is provided between the housing and the first structure, the second structure is supported by the variable mechanism, and the variable mechanism is secured to the housing and is configured to move the second structure.

4. The display device of claim 1, wherein the second structure is supported by the support body, the display module is provided between the housing and the first structure, and is secured to the first structure, the first structure and the display module are supported by the variable mechanism, and the variable mechanism is secured to the housing, and is configured to move the first structure and the display module.

5. The display device of claim 1, wherein the second structure is supported by the support body, the display module is provided between the housing and the first structure, and is secured to the housing, the first structure is supported by the variable mechanism, and the variable mechanism is secured to the housing, and is configured to move the first structure.

6. The display device of claim 1, wherein the display module comprises an illumination device and a liquid crystal panel provided between the illumination device and the first structure.

7. A display device comprising:

a housing having an upper surface and the lower surface;

a display module facing the housing and configured to emit display light which is linearly polarized light;

a first structure comprising a first retardation film facing the display module, a semi-transmissive layer attached to the first retardation film, and a second retardation film attached to the semi-transmissive layer;

a second structure comprising a reflective polarizer facing the second retardation film, a third retardation film attached to the reflective polarizer, and a liquid crystal element attached to the third retardation film and having a lens effect;

a support body secured to the housing and supporting one of the first structure or the second structure;

a variable mechanism supporting the other one of the first structure or the second structure by which an interval between the first structure and the second structure is made variable; and an aerial layer interposed between the first structure and the second structure and extending to the lower surface of the housing.

8. The display device of claim 7, wherein each of the first retardation film, the second retardation film and the third retardation film is a quarter-wave plate.

9. The display device of claim 7, wherein the liquid crystal element comprises a liquid crystal layer which is cured in a state where alignment directions of a plurality of liquid crystal molecules including first liquid crystal molecules and second liquid crystal molecules are fixed, the liquid crystal layer comprises, as seen in plan view, a first annular area in which the first liquid crystal molecules are aligned in a same direction, and a second annular area in which the second liquid crystal molecules are aligned in a same direction outside the first annular area, and the alignment direction of the first liquid crystal molecules is different from the alignment direction of the second liquid crystal molecules.

10. The display device of claim 7, wherein the first structure is supported by the support body, the display module is provided between the housing and the first structure, the second structure is supported by the variable mechanism, and the variable mechanism is secured to the housing and is configured to move the second structure.

11. The display device of claim 7, wherein the second structure is supported by the support body, the display module is provided between the housing and the first structure and is secured to the first structure, the first structure and the display module are supported by the variable mechanism, and the variable mechanism is secured to the housing and is configured to move the first structure and the display module.

12. The display device of claim 7, wherein the second structure is supported by the support body, the display module is provided between the housing and the first structure and is secured to the housing, the first structure is supported by the variable mechanism, and the variable mechanism is secured to the housing and is configured to move the first structure.

13. The display device of claim 7, wherein the display module comprises an illumination device and a liquid crystal panel provided between the illumination device and the first structure.

14. The display device of claim 7, wherein the aerial layer is interposed between the second retardation film and the reflective polarizer.

* * * * *